United States Patent [19]  [11] 3,937,565
Alasia  [45] Feb. 10, 1976

[54] PROCESS OF CODING INDICIA AND PRODUCT PRODUCED THEREBY

[76] Inventor: Alfred V. Alasia, 146-07 Thirteenth Ave., Whitestone, N.Y. 11357

[22] Filed: June 3, 1974

[21] Appl. No.: 475,951

[52] U.S. Cl. ............... 350/320; 350/131; 350/167; 354/112; 354/123
[51] Int. Cl.² ............ G02B 27/00; G03B 35/00
[58] Field of Search .......... 350/131, 167, 190, 320; 354/112, 123

[56] References Cited
UNITED STATES PATENTS

| | | |
|---|---|---|
| 3,178,993 | 4/1965 | Ferris et al. ........................ 350/167 |
| 3,524,395 | 8/1970 | Alasia ................................. 354/112 |
| 3,676,000 | 7/1972 | Mayer et al. ...................... 350/167 |

*Primary Examiner*—John K. Corbin
*Attorney, Agent, or Firm*—Schiller & Pandiscio

[57] ABSTRACT

A printed sheet of material has indicia thereon in scrambled or coded form produced by operation of an auto-stereoscopic camera using a lenticular screen. The indicia which appear inchoate to ordinary vision, can be decoded or unscrambled by viewing the same through a lenticular screen matched to that used in the scrambling process.

14 Claims, 8 Drawing Figures

PROCESS OF CODING INDICIA AND PRODUCT PRODUCED THEREBY

This invention relates to coding and decoding of indicia and more particularly to a system for producing scrambled or coded indicia, typically in printed form, and for decoding same.

To prevent unauthorized duplication or alteration of documents, frequently there is special indicia or a background pattern provided for sheet materials such as tickets, checks, currency and the like. The indicia or background pattern is imposed upon the sheet material usually by some type of printing process such as offset printing, lithography, letterpress or other like mechanical systems, by a variety of photographic methods, by xeroprinting, and a host of other methods. The pattern or indicia may be produced with ordinary inks, from special inks which may be magnetic, fluorescent, or the like, from powders which may be baked on, from light sensitive materials such silver salts and azo dyes, and the like. Most of these patterns placed on sheet materials depend upon complexity and resolution to avoid ready duplication. Consequently, they add an increment of cost to the sheet material without being fully effective in many instances in providing the desired protection from unauthorized duplication or alteration.

A principal object of the present invention is, therefore, to provide an improved and novel system for coding and decoding indicia or printed matter. Yet other objects of the present invention are to provide a novel sheet material having indicia thereon in scrambled or coded form; to provide a system for decoding such novel sheet material; and to provide a novel method for producing visually scrambled or coded indicia.

To effect the foregoing and other objects of the present invention, generally there is provided sheet material upon which indicia are imprinted in scrambled form that readily lends itself to decoding, yet which is extremely difficult to reproduce without intimate knowledge of parameters involved in producing it. The indicia are preferably produced photographically in the manner which scrambles the indicia so that it cannot be directly identified without unscrambling or decoding. The photographic method employs an autosteroscopic camera, such as the one described in my U.S. Pat. No. 3,524,395 issued Aug. 18, 1970 or in my U.S. Pat. No. 3,769,890 issued Nov. 6, 1973.

Autostereoscopic photographs in the form of parallax panoramagrams are typically produced utilizing a camera having a conventional objective lens, preferably corrected to have a flat field (generally defined as that surface in which the sharpest images are formed by a lens system when the viewed object is at infinity, or the loci of all points of collimated light imaged by the lens system). During the period of exposure, the lens is moved relative to the subject in a generally horizontal direction, linearly and at a right angle to the optical axis of the lens. This movement causes a continuously changing aspect of the subject to be presented to the camera lens. A graticule, in the form of a grid comprising narrow, substantially vertical and parallel opaque strips separated by narrower transparent strips or, preferably a lenticular screen comprising substantially vertical contiguous cylindrical lenticules, is located between the lens and the image plane (defined as that surface, generally referred to as a plane at which a lens system forms the sharpest image of an object which is at some position in front of the lens) closely adjacent the image plane. A photosensitive element such as a sensitized film is positioned at the combined image plane of the lens and graticule. During exposure, the graticule and film are moved together relative to the lens to expose successive portions of the photosensitive element underlying the graticule. One method employed in autostereography is to move during exposure the camera lens from an initial position through an intermediate position to a terminal position, and at the same time to move the camera back simultaneously and along a parallel path at a faster rate than the lens, such that a light ray from a point near the center of the subject or scene being photographed, (hereinafter called the "subject center") passing through the nodal point of the lens, is always incident upon a graticule at the same point. However, due to the spacing between the lens surfaces of the graticule and photosensitive element, the ray will fall upon the photosensitive element at progressively different points as the camera lens and back are moved, so that different aspects of the subject are presented to the lens and recorded by the photosensitive element.

Thus, if the effective lens aperture of the camera is "wide open" so that the depth of field of the camera is restricted, the camera will invariably also be focussed with the subject center at the first conjugate point and the image of the subject center at the second conjugate point (the point where the image plane and the principal optical axis intersect) in order to obtain a reasonably sharp picture. In the method of the present invention, the camera however, is deliberately defocused from the subject center (either in front or in back thereof) while the camera elements are still set up so that the light rays from the subject center pass through the second conjugate point of the lens. The effective lens aperture of the camera is then "stopped down" sufficiently to increase the depth of focus such that the defocused image now appears to be reasonably sharp and clear. Alternatively, the effective lens aperture of the camera can first be "stopped down" to locate the image plane and then defocussed. This produces a photograph which is not only a lenticular dissection of the image, but in which the displacement between the subject center and the second conjugate point introduces a scrambling factor. This photograph can be recorded on film, preferably of the self-developing type, or if multiple versions of the scrambled indicia are desired, screen positives (typically using a fine screen of substantially 300 lines per inch if the indicia to be printed are half tones) can then be made from the photographic image provided by the camera. A printing plate is then prepared from the positive, and sheet material is printed from the plate, for example, by an offset printing machine. It should be understood that the printing plate may also be made from the negative and that other printing systems can be employed to produce printed multiple versions of the inidica on sheet material. The defocused lenticular dissections or scrambled indicia thus printed, are essentially unrecognizable in the sense that the original form of the indicia cannot be identified by unaided vision. The scrambled indicia, however, can be reconstructed, unscrambled or decoded by positioning over the printed image, a transparent lenticular screen of the same nature as that used in the camera in terms of the number of lenticules per inch and the radius of curvature of the lenticules, provided, however, that the lenticular screen is positioned in the same relation to the scrambled indicia as it was positioned to the photographic image from which the printing plates were made, and also provided that there has been no magnification, either positive or negative, of the printed form of the scrambled indicia with respect to the photographic image.

It is obvious that this system can be used for many purposes such as background patterns, on documents which must be safeguarded against erasures, forgeries, counterfeiting and the like. The system may also be used for games and educational purposes, where, for example, test answers in the scrambled or coded form according to the invention can be put on the same test sheet as that containing the questions in uncoded form. Due to the inherent properties of the system, it can be used for all kinds of work other than line work, logos, solids and signatures, such as for continuous tone and half-tone material.

Other objects of the invention will, in part, appear obvious and will, in part, appear hereinafter. The invention accordingly comprises the apparatus possessing the construction, combination of elements, and arrangement of parts, and the method comprising the several steps, and the relation of one or more of such steps with respect to each of the others, all of which are exemplified in the following detailed disclosure and the scope of the application of which will be indicated in the claims.

For a fuller understanding of the nature and objects of the present invention, reference should be had to the following detailed description taken in connection with the accompanying drawings wherein:

FIG. 1 illustrates an example of an original or unscrambled indicia;

FIGS. 2A, 2B and 2C schematically represent the technique employed for forming a photographic scrambled image of the indicia of FIG. 1;

Figure 1:
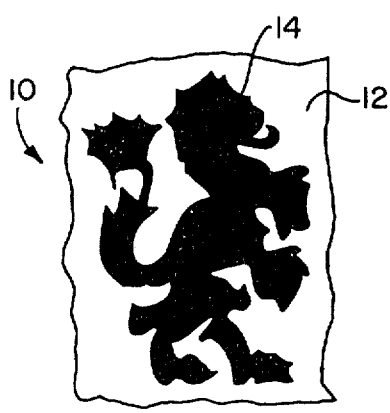

Referring to the drawings, wherein like numerals refer to like parts, FIG. 1 illustrates an example of an original or scrambled indicia which is to be used with the present invention. The indicia is shown as a pictorial design 14, which for example, may be a trademark. The design is disposed, in any known manner, on sheet 10, the latter having contrasting background 12. The minimum contrast required between design 14 and background 12 is dependent on lighting conditions under which the image of design 14 is to be recorded as well as the sensitivity of the photosensitive surface of the photosensitive element 26 on which the image of the indicia is to be recorded, element 26 being explained in greater detail hereinafter.

FIG. 2 shows schematically, the technique employed for forming a photographic scrambled image of indicia such as that shown by way of design 14 in FIG. 1. The technique is a photographic process which employs an autostereoscopic camera 18 which includes objective lens system 20, diaphragm or aperture stop 22, graticule 24 and photosensitive element 26. Examples of autostereoscopic cameras are shown and described in my U.S. Pat. No. 3,524,395 or in my U.S. Pat. No. 3,769,890 as mentioned above.

Figure 2A:
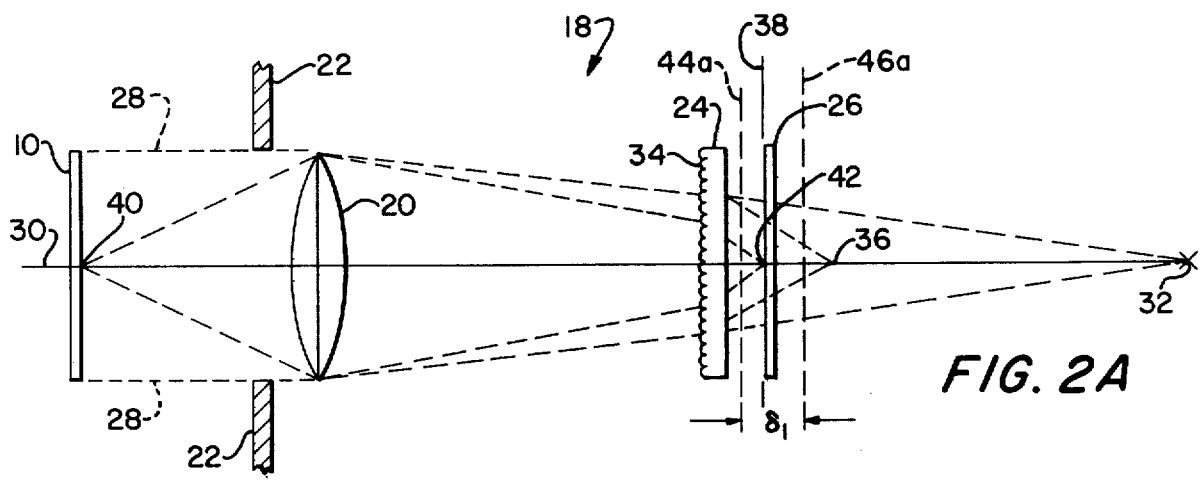

Although the objective lens system 20 is shown for purposes of clarity only as a simple convex-convex lens, it should be understood that the objective lens may be any type of single lens or combination of lenses or any other devices known which are capable of converging incoming light so that the light will be focused as an image in the image plane of the lens system. As shown in FIG. 2A, collimated light 28, or light from an object at infinity which is parallel to the principal optical axis 30 would be focused at the focal point 32 of the lens system 20 if light were left uninterrupted.

The aperture stop 22 is positioned adjacent the lens system 20. As well known in the art, the size or diameter of the stop 22 is adjustable in order that the diameter of the incoming light may be varied. As well known in the art, by reducing the size of the aperture of the stop of a lens, or by stopping down the effective lens aperture, the depth of focus (defined as the amount the image may be shifted longitudinally with respect to the image plane and introduce an acceptable blur of small enough size due to defocusing such that it will not adversely affect the performance of the system) will increase.

In the preferred embodiment, the graticule 24 is in the form of a lenticular screen which comprises substantially unidirectional contiguous cylindrical lenticules 34. The number of lenticules per inch, the orientation and the radius of curvature of the lenticules is a matter of choice, although as described in greater detail below, such factors must be known since they are critical in decoding or unscrambling the coded image which is being recorded. It should be understood therefore that the screen may comprise lenticules of other configurations such as spherical lenticules, so long as such configurations are known in order to decode or unscramble the image. As well known in the art a lenticular screen of the type described, will act as a converging lens and thus when screen 24 is disposed between lens system 20 and focal point 32, the combined lens system 20 and screen 24 will focus the collimated light 28 at the new combined focal point 36. As mentioned above, an image of an object being focused by lens system 20 and screen 24 will be focused in an image plane. This image plane will move from the focal plane (which passes through the focal point 36) toward the screen 24, as the object being viewed moves from infinity toward the camera. Thus, as shown in FIG. 2A, when the sheet 10 is positioned in front of the camera at some finite distance and the image will be focused in the image plane 38. The subject center 40 of sheet 10 which is positioned along axis 30, will be focused at the second conjugate point 42.

A photosensitive element 26, which may be photographic film or the like is positioned just behind screen 24 in the image plane 38. In this way, the camera is said to be in focus in which an image of sheet 10 can be recorded on element 26.

Figure 2B:
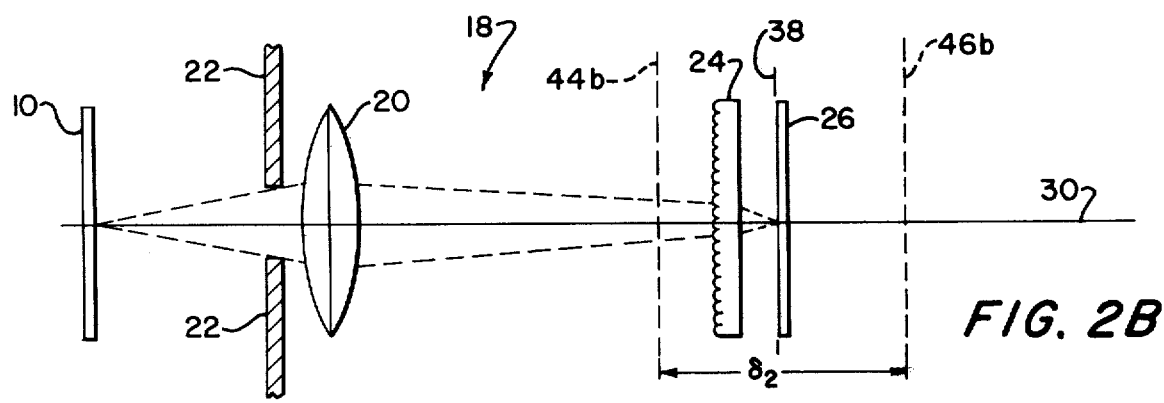

Thus, referring to FIG. 2A, an image of the sheet 10 is initially focused on the element 26 in the image plane 38. Since the aperture stop 22 is "wide open", the depth of focus, defined by dotted lines 44a and 46a will be small as defined by the distance $\delta_1$, and the image plane 38 can be easily located. Referring to FIG. 2B, the lens system 20 is "stopped down" by making the aperture stop 22 of smaller diameter. This will have the effect of increasing the depth of focus, now defined by dotted lines 44b and 46b, to a distance $\delta_2$.

Figure 2C:
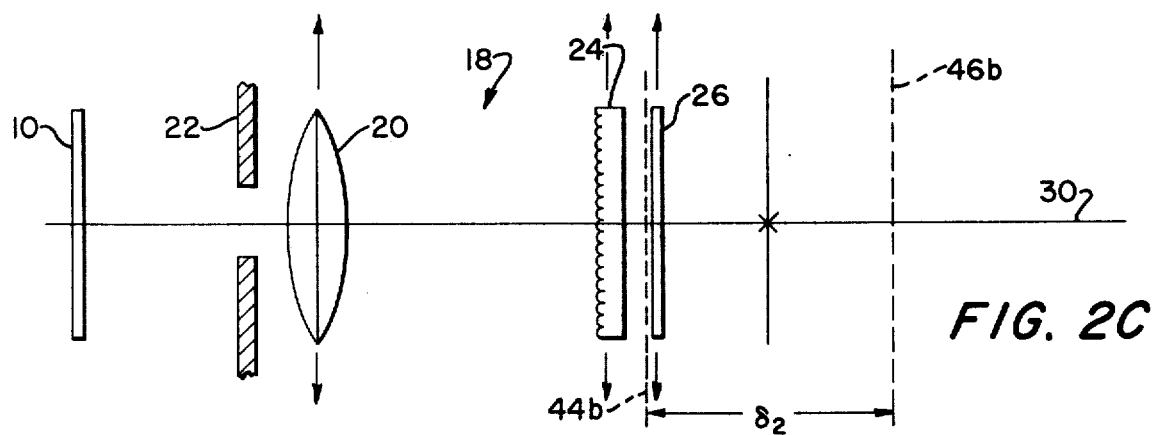

Referring to FIG. 2C, the screen 24 and element 26 are then moved longitudinally along the axis 30 either toward or away from the lens 20 until the recording surface of element 26 is disposed in the depth of focus contiguous to the limits set by lines 44b and 46b. In this way the camera is defocused to a point where there is acceptable blur as defined by the depth of focus. As noted above, in the alternative the screen 24 and element 26 can be moved first longitudinally along the axis 30 either toward or away from the lens and then the effective lens aperture can be stopped down to increase the depth of focus to extend the limits to the position of the element 26.

The camera is now set to record the coded or scrambled parallax pamoramogram. This is accomplished by opening the shutter (not shown) to expose the element 26 to the light projected from sheet 10. During exposure, the screen 24 and sheet 26 are moved together relative to the lens 20 to expose successive portions of the photosensitive element underlying the screen. According to one method, the lens 20 is moved during exposure from an initial position through an intermediate position to a terminal position, while the screen and photosensitive element are moved along a parallel path at a faster rate than the lens. The relative movements are such that the point image from the subject center 40 will be recorded in the center of the element 26 where the principal axis intersects the element 26 as a blurred spot which is moved progressively in the course of the relative movement of the lens, screen and photosensitive element.

The resulting image formed on element 26 is not only a lenticular dissection of the image, but is one in which the displacement between the subject center and the second conjugate point introduces a scrambling factor.

Figure 3:
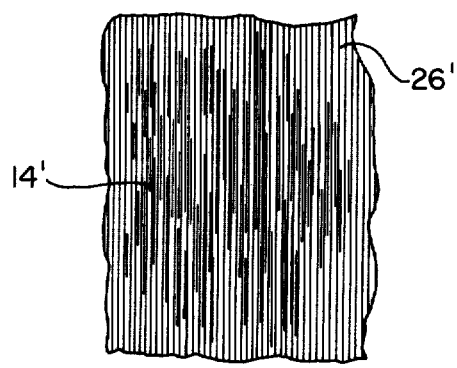
FIG. 3 illustrates the scrambled image of the indicia as provided by the method of the present invention.

The photosensitive element 26 can then be processed so that a screen positive can be made. The positive is then used to prepare a printing plate, which in turn is used to print sheet material 26', shown in FIG. 3, as having a coded or scrambled image 14' printed thereon. As noted previously, it should be understood that the printing plate may also be made from the negative of element 26 and that other printing systems can be employed to produce printed multiple versions of the coded indicia on sheet material. As shown in FIG. 3, the scrambled image 14 thus printed, is essentially unrecognizable and cannot be identified by unaided vision.

Figure 4:
FIG. 4 is an enlarged partial cross-section of the lenticular screen.

As shown in FIG. 4, in order to reconstruct, unscramble or decode the image 14, a transparent lenticular screen 24' is employed. Assuming that there has been no magnification, either positive or negative, of the printed form of the scrambled image with respect to the photographic image, the screen 24' is of the same nature as the screen 24 used in the camera in terms of the number of cylindrical lenticules 34' per inch and the radius of curvature of the lenticules. The optical thickness of the screen 24' is made as thick as the optical distance from the lenticulated surface of the screen 24 to the photosensitive surface of element 26 when the photographic image was formed.

Figure 5:
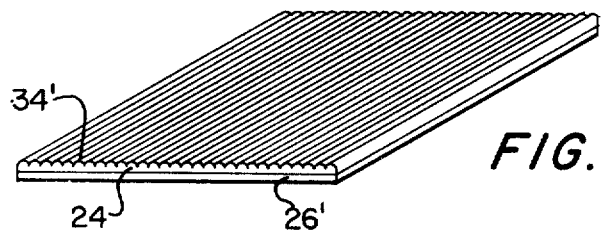
FIG. 5 shows the method of decoding the printed scrambled indicia using a transparent lenticular screen.
Figure 6:
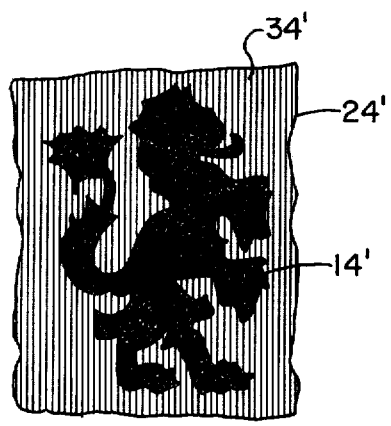
FIG. 6 illustrates the decoded or unscrambled indicia as it appears to the viewer through the lenticular screen of FIG. 4.

As shown in FIG. 5, by registering the lenticular screen 24', i.e., orienting the direction of the lenticules 34', in the same relationship to the scrambled image 14' as the screen 24 was positioned to the photographic image from which the printing plates were made, the image 14' can be reconstructed, decoded or unscrambled as illustrated in FIG. 6.

It should be realized that the scrambled image 14' cannot be easily reproduced. Such reproduction would not only require the same camera as well as knowledge of the original indicia 14, but also, inter alia, knowledge of the distance of the indicia 14 is placed from the camera, the orientation of the screen 24, the amount in which the effective lens aperture of the camera is "stopped down" and the amount to which the camera is defocused. Without this knowledge, any attempted reproduction of the scrambled image would be subject to detection.

while a particular preferred embodiment of the invention has been described, it will be understood that various changes and modifications may be made from the foregoing without departing from the spirit and scope of the appended claims.

What is claimed is:

1. A process of producing with an autostereoscopic camera having a lens and a lenticular screen which are movable relative to one another in such manner as to form a parallax panoramogram in a combined image plane, a coded or unscrambled form from an original pattern, said process comprising the steps of:

forming an image of said original pattern in said combined image plane of said lens and screen;

spacing a photosensitive element away from said image plane but within the depth of focus provided by said screen and the effective lens aperture of said camera;

exposing the spaced photosensitive element to said image while in the course of said relative movement.

2. A process in accordance with claim 1 wherein said step of spacing includes the steps of:

positioning said element in said bombined image plane;

increasing said depth of focus, and;

moving said element away from said image plane.

3. A process in accordance with claim 2, wherein said step of increasing said depth of focus includes stepping down said effective lens aperture.

4. A process in accordance with claim 3, further comprising the step of locating said image plane prior to said positioning of said element in said image plane.

5. A process in accordance with claim 1, further including the step of:

transferring an image of said formed image of said original pattern which is exposed to said photosensitive element onto a sheet.

6. A process in accordance with claim 5 wherein said step of transferring includes the steps of:

making a screen positive from said exposed image;

preparing a printing plate from said positive; and printing said image of said exposed image on said sheet.

7. A process for decoding or unscrambling the coded or scrambled form made in accordance with claim 6 including the step of:

registering the lenticules of a second lenticular screen having the same spatial distribution and radius of curvature as the lenticules of said first mentioned screen over said image printed on said sheet.

8. A process in accordance with claim 7 wherein said step of registering includes the steps of:

spacing the lenticules of said second screen from said printed image at an optical distance equal to the optical distance of the lenticules of the first screen from said photosensitive element when said exposed image is recorded on said photosensitive surface; and orienting said second lenticular screen in the same relation to the printed image as said first lenticular screen was oriented when said exposed image is recorded.

9. A sheet having a coded or scrambled form of an original pattern made in accordance with the following steps:

forming an image of said original pattern in the combined image plane of a lens and a graticule of an autostereoscopic camera;

spacing a photosenstive element, supported by said sheet away from said original image plane but within the depth of focus provided by the effective lens aperture of said camera; and exposing said photosensitive element to said image while moving said lens relative to said graticule, so that said formed image of said pattern is recorded on said element as a parallax panoramogram which is in said scrambled form.

10. A sheet made in accordance with claim 9, wherein said step of spacing includes the steps of:

positioning said element in said combined image plane;

increasing said depth of focus, and;

moving said element away from said image plane.

11. A sheet made in accordance with claim 10, wherein said step of increasing said depth of focus includes stepping down said effective lens aperture of said camera.

12. A sheet made in accordance with claim 11, further comprising the step of locating said combined image plane prior to said positioning of said element in said combined image plane.

13. A sheet made in accordance with claim 9, further including the step of reproducing said recorded image of said pattern on a second sheet to provide said coded or scrambled form.

14. A sheet made in accordance with claim 13 wherein said step of reproducing includes the steps of:

making a screen positive from said stereoscopic image;

preparing a printing plate from said positive; and printing said image of said stereoscopic image on said second sheet to form said coded or unscrambled image.

* * * * *

UNITED STATES PATENT OFFICE
CERTIFICATE OF CORRECTION

PATENT NO. : 3,937,565
DATED : February 10, 1976
INVENTOR(S) : Alfred V. Alasia

It is certified that error appears in the above-identified patent and that said Letters Patent are hereby corrected as shown below:

Column 6, line 25, "unscrambled" should read --scrambled--.

Signed and Sealed this fourth Day of May 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,937,565
DATED : February 10, 1976
INVENTOR(S) : Alfred V. Alasia

It is certified that error appears in the above-identified patent and that said Letters Patent are hereby corrected as shown below:

Column 8, line 25, "unscrambled" should read --scrambled--.

Signed and Sealed this

Fifteenth Day of March 1977

[SEAL]

Attest:

RUTH C. MASON
*Attesting Officer*

C. MARSHALL DANN
*Commissioner of Patents and Trademarks*